Dec. 17, 1968   R. W. POSEGATE   3,416,931
PREPARING POULTRY LOAF PRODUCT
Filed Feb. 27, 1967   2 Sheets-Sheet 1
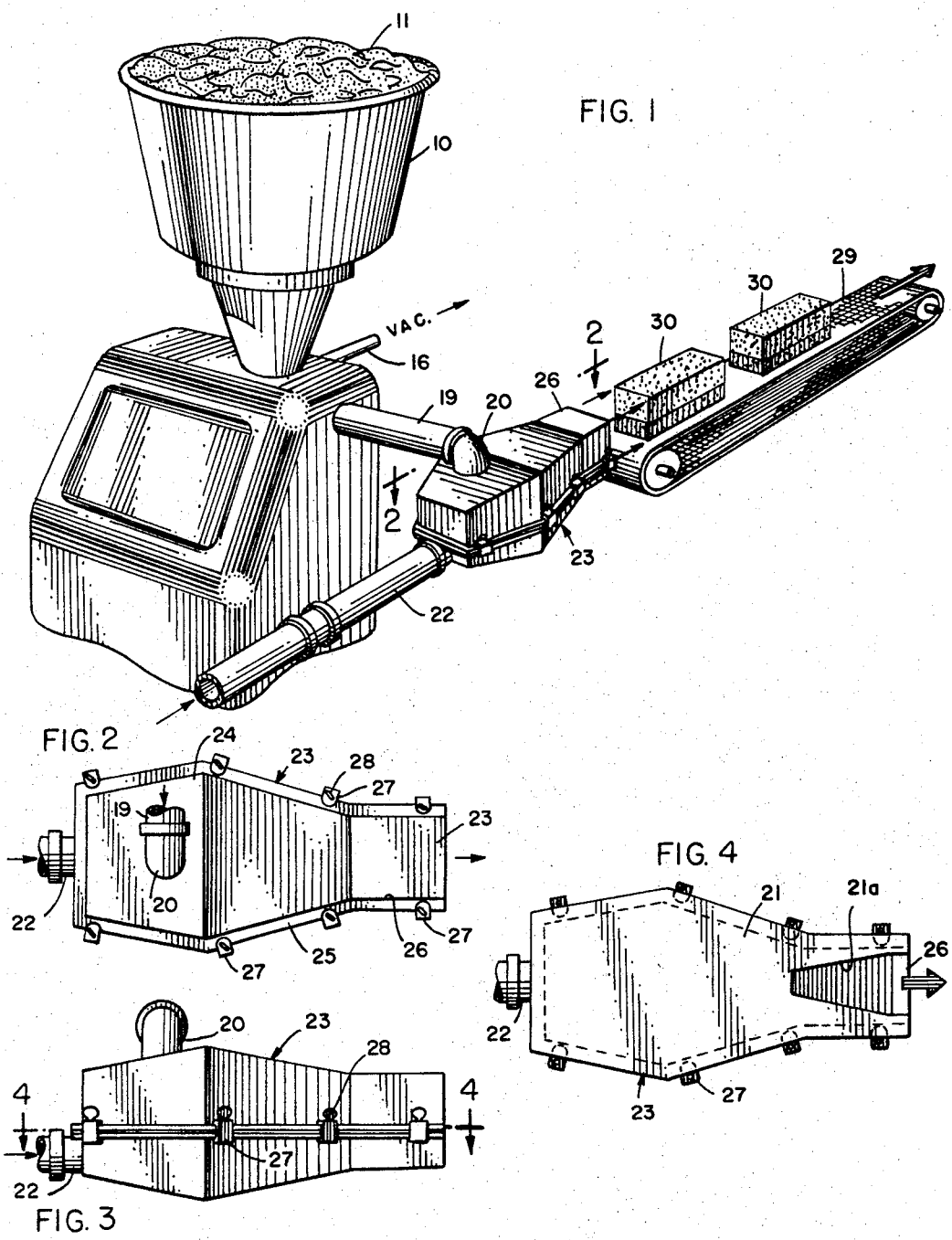
INVENTOR:
RUSSELL W. POSEGATE
BY:
Carl C. Batz
ATT'Y Dec. 17, 1968 R. W. POSEGATE 3,416,931
PREPARING POULTRY LOAF PRODUCT
Filed Feb. 27, 1967 2 Sheets-Sheet 2
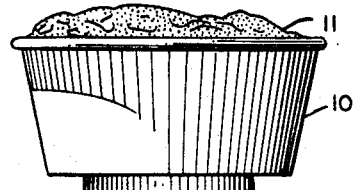
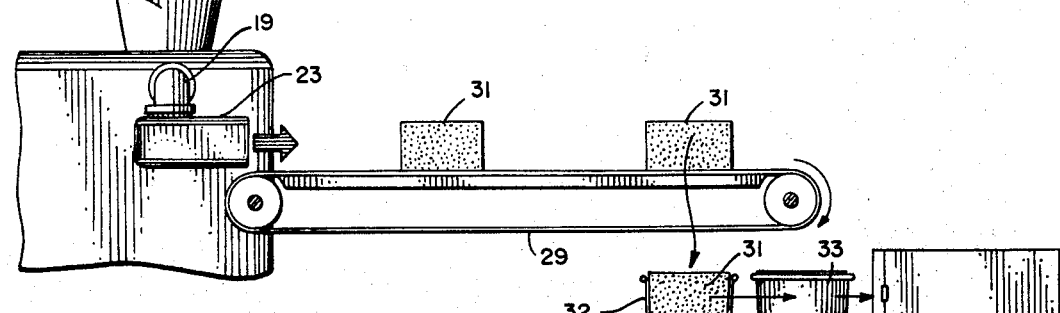
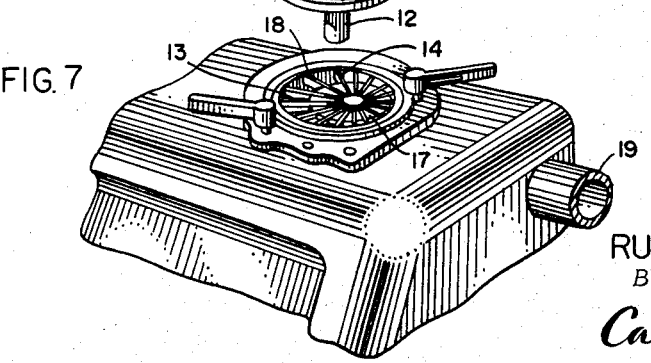
INVENTOR:
RUSSELL W. POSEGATE
BY
Carl C. Batz
ATT'Y United States Patent Office 3,416,931
Patented Dec. 17, 1968

3,416,931
PREPARING POULTRY LOAF PRODUCT
Russell W. Posegate, La Grange Park, Ill., assignor to Armour and Company, Chicago, Ill., a corporation of Delaware
Filed Feb. 27, 1967, Ser. No. 618,729
10 Claims. (Cl. 99—107)

ABSTRACT OF THE DISCLOSURE

Raw poultry pieces, which have been treated with an edible metallic salt and agitated to extract a salt-soluble coating or binder on the pieces, are extruded through a nozzle to unite the pieces and discharge them in the form of a shape-sustaining loaf onto an open receiving surface. The extruded chamber may be divided, white meat being fed to one section at the side of the divider and dark meat pieces fed to the other section, and the two meat bodies being brought together in the nozzle to unite them in a single loaf or in an elongated body which is cut to form separate loaves for enclosure in containers.

BRIEF SUMMARY OF THE INVENTION

In prior practice, elongated raw meat pieces have been cut from poultry and extracted with a metallic salt at low temperatures to provide a salt-soluble protein adhesive coating the pieces and which can bind the pieces together when the pieces are pressed into contact. The loaf may consist of white meat alone or dark meat alone, but the product is especially attractive when the loaf is formed with a white meat section and a dark meat section united thereto, one above the other. In forming the loaf in one body or in two sections, a problem is encountered in bringing the meat pieces together into a sturdy loaf which will not separate and in which the pieces are united in horizontal alignment so that the grain of the meat in the loaf runs in a horizontal direction so that the slice can be crosswise to the grain, giving a better and more tender slice.

In the prior practice, the elongated meat pieces have been laid by hand in a container, but this is a laborious and expensive operation and air pockets are formed in the loaf product. Further, to meet the problem, the elongated pieces after being arranged by hand in parallel arrangement have been pressed by a paddle through a stuffer and into a plastic sheath or tube. Here, however, the elongated pieces have been pressed laterally out of horizontal alignment and the final product has air pockets or voids therein. Further, when the loaf consists of a white meat section superposed over a dark meat section, it is found that the two sections become mixed in the final package and with portions of the dark meat extending upwardly almost to the top of the white meat section.

I have discovered that a uniform product can be prepared with a minimum of expense, substantially free of voids, and having as much as 90–100 percent of the elongated meat pieces in horizontal alignment. By preparing the meat pieces through the application of an edible metallic salt and under agitation to provide an adhesive binder coating of salt-soluble protein on the pieces, and by passing the mass under pressure and vacuum into an extruding chamber, I find that the elongated pieces orient themselves rapidly and may be discharged through the extrusion nozzle of the chamber onto an open receiving surface to provide a shape-retaining loaf. In practice, the loaf may be elongated and may be cut to form unit loaves of the desired size. Further, in such extrusion, a divider may be employed to separate dark meat from light meat while bringing the two bodies together in the extrusion nozzle for uniting the same into a loaf having a relatively straight line of division between the light and dark meat sections.

By providing the extrusion chamber with forwardly- and inwardly-tapering sides leading to the extrusion nozzle, the orientation of the elongated pieces into the horizontal plane is facilitated, while at the same time the extruded body may be formed by a suitable nozzle into shapes which are polygonal, rectangular, or square in cross section, or in any other desired shape.

DESCRIPTION OF THE DRAWINGS

In the drawings, FIG. 1 is a broken perspective view of apparatus which may be employed in the use of my invention; FIG. 2, a longitudinal sectional view of the extruder chamber, the section being taken as indicated at line 2—2 of FIG. 1; FIG. 3, a side view in elevation of the structure shown in FIG. 2; FIG. 4, a longitudinal sectional view along the line of the divider plate, the section being taken as indicated at line 4—4 of FIG. 3; FIG. 5, a side view in elevation of the apparatus shown in FIG. 1 but with the divider plate removed for forming a unitary type of poultry meat loaf; FIG. 6, a broken perspective view of a portion of the apparatus employed for receiving the elongated poultry pieces and for forming an air seal above the propeller apparatus; and FIG. 7, a broken perspective view of the propeller apparatus for directing the meat pieces into the extruder chamber.

DETAILED DESCRIPTION

In the apparatus shown in the drawings, 10 designates a container or hopper adapted to receive elongated poultry meat slices indicated by the numeral 11. The pieces form an air seal above the discharge pipe 12 leading from the lower portion of the receptacle 10 and discharging into the outer free working space 13 of the impeller 14. A feeder blade 15 is mounted within the lower portion of the container 10 for feeding the meat pieces downwardly through the pipe outlet 12 and is rotated by a power shaft driven by motor means (not shown). As shown best in FIG. 1, a vacuum pipe 16 leads into the area above the impeller 14 and to a suitable source of suction for maintaining the impeller area under vacuum.

The impeller 14 may be of any suitable construction. I prefer to employ an impeller of the type shown in which a central hub 17 is provided with slots into which blades 18 may move inwardly and outwardly on inner blade stems and in telescoping relation therewith through the chamber 11 in which the hub 17 is eccentrically mounted. The outer ends of the telescoping blades 18 are provided with hooks engaging a channel within the impeller chamber so that as the hub rotates, the blades 18 move inwardly and outwardly and, when extended, propel the meat mass received from pipe 12 toward the outlet pipe 19 leading from the propeller chamber. Since such structure is well known, a further detailed description herein is believed unnecessary.

In the specific illustration given in FIGS. 1–4, the meat from container 10, which is preferably white meat, is discharged through a downwardly-turned end member 20 into the upper section of an extrusion chamber which is provided with a longitudinally-extending divider plate 21. Dark meat is discharged through a pipe 22 leading from apparatus similar to that shown and described above as consisting of a container 10, impeller 14, etc., into the lower portion of the extruder 23 below the divider plate 21.

In the illustration given, the extruder 23 has an enlarged central area 24 for receiving the meat pieces and forwardly-tapering sides 25 merging into an extrusion nozzle 26. The extruder 23 is formed in two parts, and between the two parts extends the divider 21. To unite the two parts, flanges 27 are provided having aligned threaded openings, and screw tabs 28 may be used to clamp the two flanged portions together.

In the operation of the process, the divider plate 21 may be secured in position as shown in FIGS. 1–4 and the white meat pieces fed by the rotary member 15 through pipe 12 into the spaces between the extended impeller blades 18, so that the slices are then fed through the pipe 19 into the upper chamber of the extruder 23. Similarly, the dark meat slices may be fed from apparatus similar to that described above but discharged through pipe 22 into the lower chamber of the extruder 23 below the divider plate 21, and the two bodies may be brought together under pressure and discharged through the nozzle 26 onto a continuous conveyor 29 or any suitable open receiving surface. In the illustration given in FIG. 1, the meat loaf 30 formed of an upper section of light (white) meat and a lower section of dark meat is formed by cutting the elongated extruded body into the load sections illustrated.

If desired, the divider plate 21 may be omitted and the extruder 23 employed for extruding onto the conveyor 29 a unitary load 31 formed of light meat only, or, if desired, dark meat only. As above described, the discharged body from the extruder is an elongated ribbon or loaf body which may be severed by a saw or knife to form the separate loaf 31, and the loaf 31 may then be introduced into a container 32, preferably formed of aluminum, or other suitable container in which the raw product may be later cooked. After placing the extruded loaf 31 into the container, a closure 33 may be pressed in place and the product then passed into a refrigerator 34 to chill the product to a freezing temperature for preserving it during shipment and sale and until the product is ready for cooking.

When the roast product is to be cooked, the container 32 with its closure 33 removed may be placed within the oven of a range and cooked to the desired temperature under aluminum foil.

The meat pieces may be treated in any suitable manner with the edible metallic salt for extracting the salt-soluble protein coating. The procedure is described in detail in U.S. Patent No. 3,285,752. In the operation, the edible salt, which may consist of sodium chloride, potassium chloride, and various phosphates, may be employed in a concentration within the range of about 0.1 and 2.0 or 2.5 percent and the pieces agitated at a temperature within the range of 25–70° F. to bring about the desired salt-soluble binder coating. If desired, poultry skin and small poultry pieces, either separately or together, may be ground to form a paste and the paste incorporated with the elongated poultry pieces, the paste being incorporated preferably within the range of about 10–35 percent of paste based on the total weight of the mixture, all as described in detail in U.S. Patent No. 3,285,753.

In the extrusion operation, sufficient pressure is employed for forcing the meat pieces into solid contact as they leave the extrusion nozzle so that the extruded loaf deposited on the conveyor 29 or other open surface is shape-retaining and, in fact, so firmly united that the pieces remain firmly knitted together during the sawing or separating operation. The cutting may be by knife, saw, shears, or other suitable severing device.

Any suitable feeder or stuffer device may be used to feed the meat pieces to the extruder 23.

In order to firmly unite the dark meat layer to the white meat layer, I prefer to cut away a portion of the divider plate at 21a, as shown more clearly in FIG. 4. The entire plate portion within the nozzle may be cut away, but I prefer a notched area, as shown in FIG. 4 because this brings the central portions of the white and dark meat bodies together first and the area of contact is gradually widened as the combined body moves forwardly. It is found that this arrangement is advantageous because the central portions of the dark and light meat bodies are united first under heavy pressure, and when the loaf is later dicharged, a strong interior union is effected. Further, during the cooking operation, there is no tendency for the light and dark sections to separate in the central portions of the loaves.

Specific examples illustrative of the invention may be set out as follows:

Example I

Turkeys were slaughtered, dressed, and slush-ice chilled to a temperature of 35° F. The chilled turkeys were then boned, keeping the temperature of the meat below 50° F. during the entire procedure. The breast meat (light meat) was carefully removed by hand-boning and kept in a separate container. Dark meat was removed from the thigh portion of the leg and also kept in a separate container.

Five hundred pounds of white meat were placed in an Anco Vacuum Mixer and 7.5 pounds of sodium chloride were sprinkled evenly over the surface of the meat. The mixer was operated for 15 minutes, during which time the white meat became soft and pliable and covered with a creamy, sticky coating.

The dark meat was similarly treated, the mixing being carried on for about 18 minutes. Portions of the white meat were then introduced into the apparatus, as shown in the drawings, so as to substantially fill and seal the container 10, and similarly the dark meat was introduced into a container 10 of a companion apparatus to seal the top of the container. A vacuum was maintained on each impeller device and the machines were operated as described above, the meat being fed by the blade 15 through the pipe 12 and between the extended blades 18 of impeller 14, the meat being discharged into the extruder 23. Dark meat was fed through the lower section below the divider plate 21 and the white meat in the section above divider plate 21. The two bodies were brought together along the notched area 21a of FIG. 4 to form a strong central union between the bodies. The elongated extruded body was severed by a saw to form the loaves 30, as shown in FIG. 1. It was found by test that the white meat section had about 95 percent of the elongated meat pieces horizontally aligned in the parallel formation. The dark meat section consisted of smaller meat pieces and about 80 percent of these pieces were horizontally aligned. The loaves 30 remained intact during the sawing operation which separated them from the extruded long body and they were found to be free of voids.

The loaves were placed in containers 32 and sealed with covers 33 and the complete product chilled in a refrigerator 34. Later the chilled package was placed in an oven and cooked at about 170° F. for a period of time corresponding to 25 minutes for each pound of product weight. The meat maintained the shape of the original loaf and, when sliced, gave a uniform area of white and dark meat integrated along a substantially straight line.

Example II

The process was carried out substantially as described in Example I except that the divider plate of the extruder 23 was removed and only white meat was passed through the extruder 23. An elongated extruded loaf was formed which was then cut up by saw into loaves 31. These were introduced into containers 32 and sealed with closures 33. Ninety percent of the elongated meat pieces were found to be horizontally aligned. The product after chilling was cooked, as described in Example I, with substantially the same results.

Example III

Turkeys were slaughtered, chilled, and boned, as described in Example I, the breast meat and dark meat being kept in separate containers. The white meat was chilled, mixed with salt, and agitated in an Anco Vacuum Mixer, as described in Example I. A batter was prepared by mixing 41 pounds of skin, 20 pounds of wing knobs, and 21 pounds of boneless scrap white meat, and the mixture was placed in a pre-chilled silent cutter along with 1.9 pounds of a salt and spice mixture containing 1.2 pounds of sodium chloride. The mixture was chopped for 5 minutes and the chopped batter chilled to 35° F. The batter was added to the white meat in the Anco Vacuum Mixer in the proportion of 85 pounds of batter to 500 pounds of white meat. After the mixer had been operated on the white meat for 5 minutes and after the adding of the batter, the mixing was continued for an additional 15 minutes. A vacuum of 22 inches was maintained during the mixing operation.

The mixture was then transferred to the vessel 10 of the apparatus shown in the drawing in an amount to fill the container and seal the same. As described in Example I, the meat was fed by a blade 15 through pipe 12 into the impeller between extended blades 18 while maintaining a vacuum of 22 inches on the impeller chamber, and the mixture was then forced through pipe 19 into the extruder 23 from which the divider plate 21 had been removed. The mixture was forced through the extruder nozzle 26 and onto the belt 29.

The extruded elongated body was cut into loaves 31 and were found to be free of voids. To determine the horizontal orientation of the pieces, each loaf or roast 31 was cut in pieces of 1½ to 2 inches in length, and the meat pieces carefully separated by hand. The examination showed 95–100 percent of the white meat pieces lying in a horizontal parallel plane. In contrast with other tests carried on with dark meat pieces which were smaller and thinner in size, it was found that the dark meat horizontal alignment was from 60 to about 95 percent.

The chilled loaves or roasts were cooked with the results described in Examples I and II.

Example IV

The process was carried out as described in Example I except that a paste prepared by grinding poultry skin and small poultry pieces and treated as described in Example III was incorporated in the proportion of about 20 percent of the paste based on the total weight of the mixture. The white meat and the dark meat were discharged by the impeller apparatus 14 through pipe 19 into the extruder 23 having the divider plate 21 in position. The white and dark meat were discharged, forming an elongated loaf body which was then severed by a saw to form the roast loaves 30, as shown in FIG. 1. The loaves were free of voids, and the white meat had the elongated pieces horizontally aligned to the extent of 99 percent, while the dark meat pieces were horizontally aligned to the extent of 65 percent. The product was cooked as described in Example I and the pieces were found to be uniform and continuous and the line between dark and white meat was substantially straight.

Example V

The process was carried out as described in Example III except that the batter from the silent cutter having an elevated temperature in the neighborhood of about 65° F. was added directly to the chilled meat in the Anco Vacuum Mixer.

Example VI

Chickens were slaughtered and dressed and slush-ice chilled to a temperature of 35° F. and the chilled carcasses boned to collect dark and white meat separately in pieces. The pieces were processed as described in Example I and with substantially the same results.

While in the foregoing specification I have described the white meat layer as being above the dark meat layer, it will be understood that this order can be reversed, the layers being arranged in any desired relation.

It was surprising to find that the elongated pieces became oriented into longitudinal or parallel alignment, with 95–100 percent of the larger or white meat pieces being in alignment and with 60–90 percent of the dark meat pieces being longitudinally aligned, in view of our prior practice in which the pieces were laid in a two-part mold, open at both ends, and the pieces then pushed into a casing, with the result that the sticky pieces lost their longitudinal alignment and were twisted and curved in the package.

While in the foregoing specification I have set out specific procedure and structure in considerable detail for the purpose of illustrating embodiments of the invention, it will be understood that such details may be varied widely by those skilled in the art without departing from the spirit of my invention.

I claim:
1. In a process for preparing a poultry loaf product in which a raw poultry carcass is boned to remove elongated meat pieces and in which an edible metallic salt is applied to the pieces to extract salt-soluble protein from the meat providing an adhesive coating on the pieces, the improvement which comprises extruding a layer of elongated protein-coated pieces under pressure onto an open support to align at least about 60–90 percent of said elongated pieces in parallel relation within said layer whereby the protein coating on said pieces serves as a binder to maintain said pieces in a shape-sustaining loaf, the grain of the meat running longitudinally of said aligned pieces.

2. The process of claim 1 in which said extruded loaf body is severed transversely to form separate loaves.

3. The process of claim 1 in which white meat pieces and dark meat pieces are separately collected and are extruded under pressure in separate layers of white and dark meat pieces with at least 60–90 percent of the pieces aligned in one of said layers and with said layers in binding contact uniting said layers along a relatively straight line of division between the light and dark meat portions.

4. The process of claim 3 in which said white meat pieces are extruded on one side of a divider plate extending longitudinally of an extrusion pipe and said dark meat pieces are extruded as another layer on the opposite side of said plate whereby said layers are united along a straight line into a shape-sustaining loaf.

5. In a process for preparing a poultry loaf product in which a raw poultry carcass is boned to remove meat pieces and the pieces mixed with an edible metallic salt to extract salt-soluble protein as an adhesive coating on the pieces, the improvement which comprises impelling said adhesive protein-coated pieces through a closed elongated zone into an extrusion nozzle of reduced cross-section to press said pieces into solid contact and to knit them into a continuous shape-sustaining loaf.

6. The process of claim 5 in which said continuous extruded loaf is severed transversely.

7. The process of claim 5 in which said loaf is extruded with retangular transverse cross-section.

8. The process of claim 5 in which said meat pieces are extruded as separate layers on opposite sides of a divider plate extending longitudinally of the extrusion nozzles for uniting the layers into a loaf having a relatively straight line of division between the layers.

9. The process of claim 8 in which the central portions of said layers of meat pieces are first brought into contact with each other under pressure and the outer portions of said layers then brought into contact with each other under pressure to unite said layers into a shape-sustaining loaf.

10. The process of claim 8 in which one of said layers consists predominantly of white meat pieces and the other layer consists predominantly of dark meat pieces with the white meat pieces forming the larger layer in the loaf.

(References on following page)

References Cited

UNITED STATES PATENTS

| | | | |
|---|---|---|---|
| 797,276 | 8/1905 | Glauser | 107—1.4 |
| 1,463,851 | 8/1923 | Smith | 107—1.4 X |
| 2,020,843 | 11/1935 | Lohner | 99—194 X |
| 2,425,912 | 8/1947 | Appel et al. | 99—109 X |
| 3,100,710 | 8/1963 | Carlin | 99—107 |
| 3,285,752 | 11/1966 | Hansen et al. | 99—107 |
| 3,285,753 | 11/1966 | Sohwall et al. | 99—107 |
| 3,298,057 | 1/1967 | Liebmann | 99—109 X |

HYMAN LORD, *Primary Examiner.*